United States Patent
Glass, Jr.

(10) Patent No.: US 9,857,092 B2
(45) Date of Patent: Jan. 2, 2018

(54) INJECTION MOLDED HVAC DIFFUSER ASSEMBLY

(71) Applicant: American Louver Company, Skokie, IL (US)

(72) Inventor: Geoffrey M. Glass, Jr., Lincolnshire, IL (US)

(73) Assignee: American Louver Company, Skokie, IL (US)

( * ) Notice: Subject to any disclaimer, the term of this patent is extended or adjusted under 35 U.S.C. 154(b) by 691 days.

(21) Appl. No.: 14/215,285

(22) Filed: Mar. 17, 2014

(65) Prior Publication Data

US 2014/0273804 A1 Sep. 18, 2014

Related U.S. Application Data

(60) Provisional application No. 61/801,797, filed on Mar. 15, 2013.

(51) Int. Cl.
*F24F 13/08* (2006.01)
*F24F 13/072* (2006.01)
*B29C 45/00* (2006.01)

(52) U.S. Cl.
CPC .......... *F24F 13/072* (2013.01); *B29C 45/006* (2013.01); *B29C 2045/0093* (2013.01)

(58) Field of Classification Search
CPC ............ F04D 25/088; F24F 2013/0616; F24F 2221/14; F24F 13/06; F24F 7/10; F24F 13/062; F24F 13/075; F24F 13/08; F24F 13/14; F24F 13/141
USPC .......................... 454/310, 292, 248, 296, 299
See application file for complete search history.

(56) References Cited

U.S. PATENT DOCUMENTS

| | | | |
|---|---|---|---|
| 4,714,009 A * | 12/1987 | DeHart | F24F 13/062 454/300 |
| 6,135,878 A | 10/2000 | Felsen | |
| 2004/0072531 A1 * | 4/2004 | Hurlstone | B60H 1/00471 454/136 |

* cited by examiner

*Primary Examiner* — Steven B McAllister
*Assistant Examiner* — Ko-Wei Lin
(74) *Attorney, Agent, or Firm* — McDermott Will & Emery LLP (57) ABSTRACT

An air diffuser for use at a ventilation outlet of an HVAC system. The air diffuser comprises a base platform having an opening plenum formed from injection-molded plastic, the base platform including a collar for attachment to the outlet, the plenum defined by a perimeter rim, the edges of the rim lying substantially within a first common plane, at least one first diffuser plate positioned over the plenum, the first diffuser plate formed from injection-molded plastic and having edges lying substantially within a second common plane, and a plurality of stems integrally molded with one or more of the first diffuser plate and the base, the stems configured to secure the first diffuser plate to the base platform, each of the stems having a first end sized to fit within a complimentary female receptacle formed in one of the first diffuser plate and the base platform, the stems being formed via injection molding with one of the first diffuser plate and the base platform.

14 Claims, 7 Drawing Sheets

INJECTION MOLDED HVAC DIFFUSER ASSEMBLY

CROSS-REFERENCE TO RELATED APPLICATIONS

This application claims the benefit of and priority to U.S. Provisional Patent Application No. 61/801,797, filed Mar. 15, 2013, the entire contents of which is hereby incorporated by reference herein.

FIELD OF THE INVENTION

The present invention relates to the field of heating, ventilation and air conditioning (HVAC). In particular, the invention relates to an air diffuser and a method of making same using injection-molded plastic.

PRIOR ART

Various forms of ceiling-mounted, louvered diffuser s are used as outlets in HVAC systems. Such diffuser s are often heavy and expensive due to the fact that they are formed from sheet steel or other heavy materials. Furthermore, these materials have significant disadvantages due to their tendency to corrode or rust, which results in spots, irregularities or staining on paint that covers the metal diffuser. Moreover, metal diffuser s are susceptible to damage during construction as some of the louvers are bent or dented.

Some manufacturers have attempted to form such diffuser s using thermoformed plastic, but the louver forms are typically fastened together using substandard attachment techniques, such as clips, that are not structurally dependable. Such structures may be susceptible to damage, rattling or have other undesirable characteristics.

SUMMARY

The subject matter addressed herein relates generally to air diffusers and a method of making them. Features, advantages and embodiments of the subject matter may be set forth, or be made apparent, from consideration of this disclosure. It is to be understood that this disclosure is exemplary in nature and sets forth certain aspects of the relevant subject matter without limiting the scope of the appended claims.

In a first embodiment, an air diffuser for use at a ventilation outlet of an HVAC system comprising a base platform having an opening plenum formed from injection-molded plastic, the base platform including a collar for attachment to the outlet, the plenum defined by a perimeter rim having edges, the edges of the rim lying substantially within a first common plane, at least one first diffuser plate positioned over the plenum, the first diffuser plate formed from injection-molded plastic and having edges lying substantially within a second common plane, and a plurality of stems integrally molded with one or more of the first diffuser plate and the base platform, the stems configured to secure the first diffuser plate to the base platform, each of the stems having a first end sized to fit within a complimentary female receptacle formed in one of the first diffuser plate and the base platform, the stems being formed via injection molding with one of the first diffuser plate and the base platform.

In a second embodiment, a method of making an air diffuser for use at a ventilation outlet of an HVAC system comprises the steps of injection molding a base platform having an opening plenum, the base platform including a collar for attachment to the outlet, the plenum defined by a perimeter rim having edges, the edges of the rim lying substantially within a first common plane, injection molding at least one first diffuser plate and positioning it over the plenum, the first diffuser plate having edges lying substantially within a second common plane, and integrally injection molding a plurality of stems with one or more of the first diffuser plate and said base platform, the stems configured to secure the first diffuser plate to the base platform, each of the stems having a first end sized to fit within a complimentary female receptacle formed in one of the first diffuser plate and the base platform.

BRIEF DESCRIPTION OF THE DRAWINGS

FIG. 8b illustrates a plane view of the embodiment of FIG. 8a;

DETAILED DESCRIPTION OF THE DRAWINGS AND THE PRESENTLY PREFERRED EMBODIMENTS

While the subject matter of this disclosure can be practiced and carried out in many different ways, certain specific embodiments are shown in the drawings and described in detail with the understanding that such drawings and description are exemplary in nature and are not intended to limit the scope of the invention set forth in claims only to those embodiments that are illustrated and described.

Disclosed herein and as shown in the accompanying drawings are multiple embodiments of an air diffuser having parts formed almost entirely from injection-molded plastic. The louvered forms are formed each in one piece from injection-molded plastic, with separating stems integrally molded to project from either the form or a base platform. The stems fit into complimentary receptacles on the adjacent louver form or base platform and are secured via metal screws. The resulting diffuser is securely assembled to provide a lasting and durable diffuser configuration that is virtually indistinguishable from the look of metal diffuser s. Other features, such as D-shaped securement tabs for the stems, and integrally molded duct tabs allow for easy assembly together and assembly of the entire unit easily to the ductwork.

A plurality of drawings included herewith illustrate the diffuser configuration in accordance with the present invention.

As shown in FIGS. 1-7, these embodiments of the diffuser 10 comprises a set of injection molded components. In particular, the components comprise a concave base platform 20 defining a plenum 12 with concave center diffuser plate 30 and concave top diffuser plate 40, each of which are injection molded. The center and top diffuser plates preferably nest at least partially within each other and the plenum 12 as shown. The perimeter of the base platform 20 is defined by a rim 22 having edges 24. The edges 24 may lie within a single plane, in this example having a square shape. Other configurations are possible, such as round or rectangular.

To mount the center diffuser plate 30 to the base platform 20, a plurality of stems 70 are formed around the center opening 35 of the center diffuser plate 30. These stems 70 extend downwardly from the center diffuser plate 30, and include free ends that may fit into receptacles 142 in the base platform 20. This is shown more clearly in the cross section of FIG. 2. Preferably the stems 70 are hollow to facilitate the reception of mounting screws 150 upwardly through the base platform 20 and into the stems 70 as shown in FIG. 2.

Figure 5:
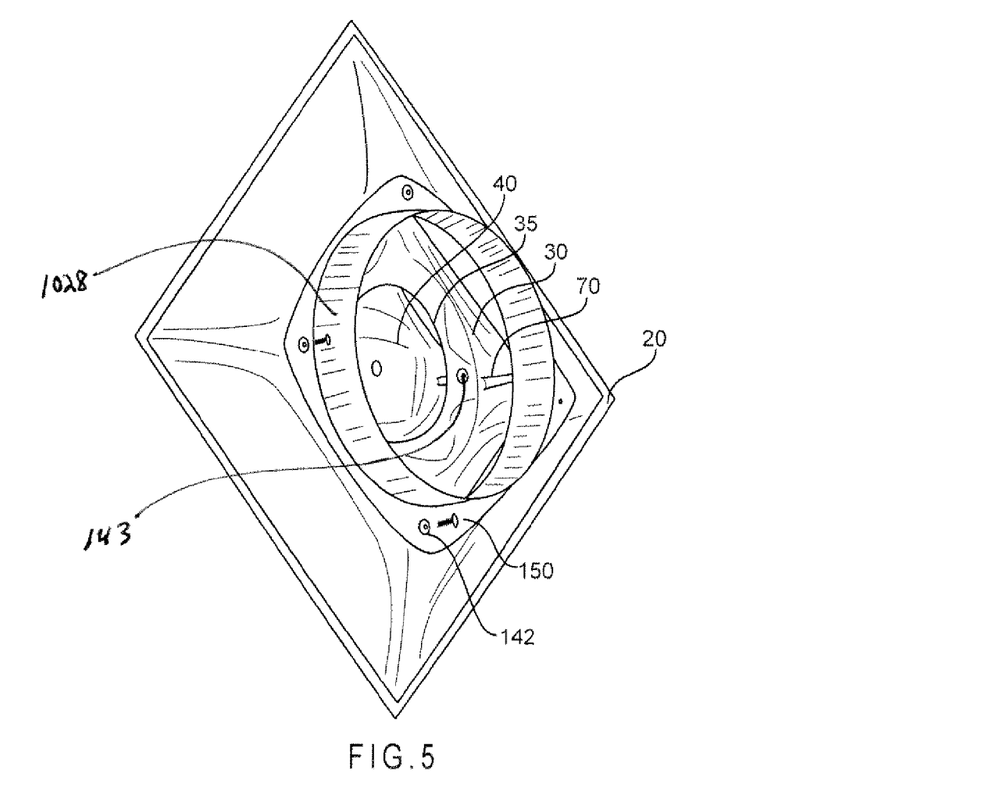
FIG. 5 illustrates a perspective view of the embodiment of FIG. 1.
Figure 6:
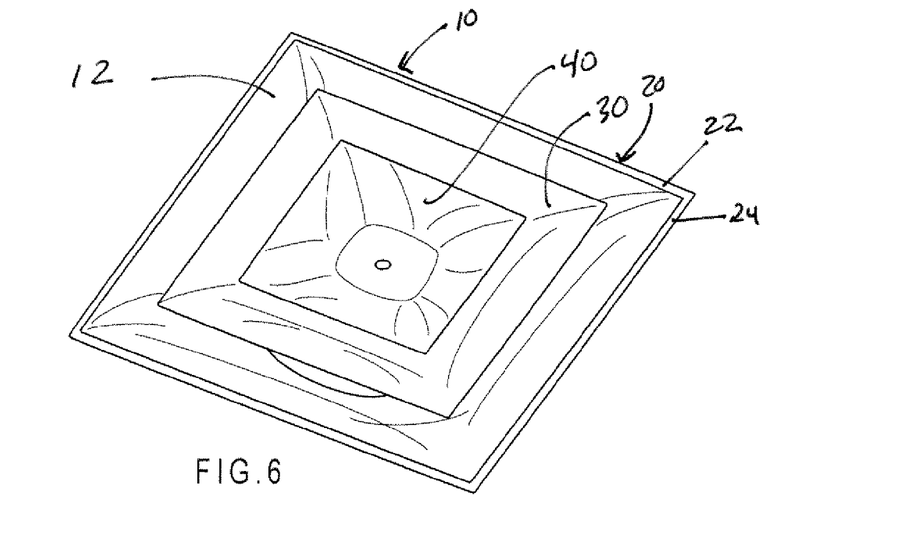
FIG. 6 illustrates a perspective view of the embodiment of FIG. 1.
Figure 7:
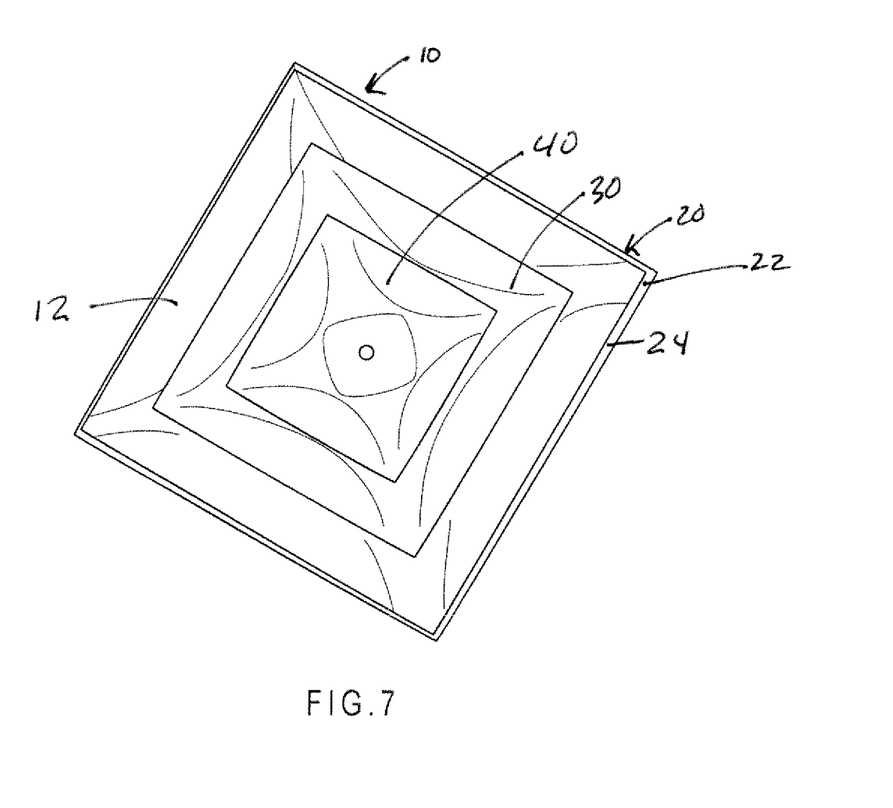
FIG. 7 illustrates a planar view of the embodiment of FIG. 1.

FIG. 5 shows a rear side of the first embodiment, showing molded-in receptacles 142 that are reinforced by annular molding formations. These receptacles 142 may receive mounting screws 150 to fasten the base platform 20 with the stems 70 of the center diffuser plate 30.

To mount the top diffuser plate 40 to the center diffuser plate 30, a plurality of stems 70 are formed extending downwardly from the top diffuser plate 40, and include free ends that may fit into receptacles 143 in the center diffuser plate 30. This is shown more clearly in the cross section of FIG. 2. Preferably the stems 70 are hollow to facilitate the reception of mounting screws 150 upwardly through the center diffuser plate 30 and into the stems 70 as shown in FIG. 3. These receptacles 143 may receive mounting screws 150 to fasten the center diffuser plate 30 with the stems 70 of the top diffuser plate 40.

Figure 1:
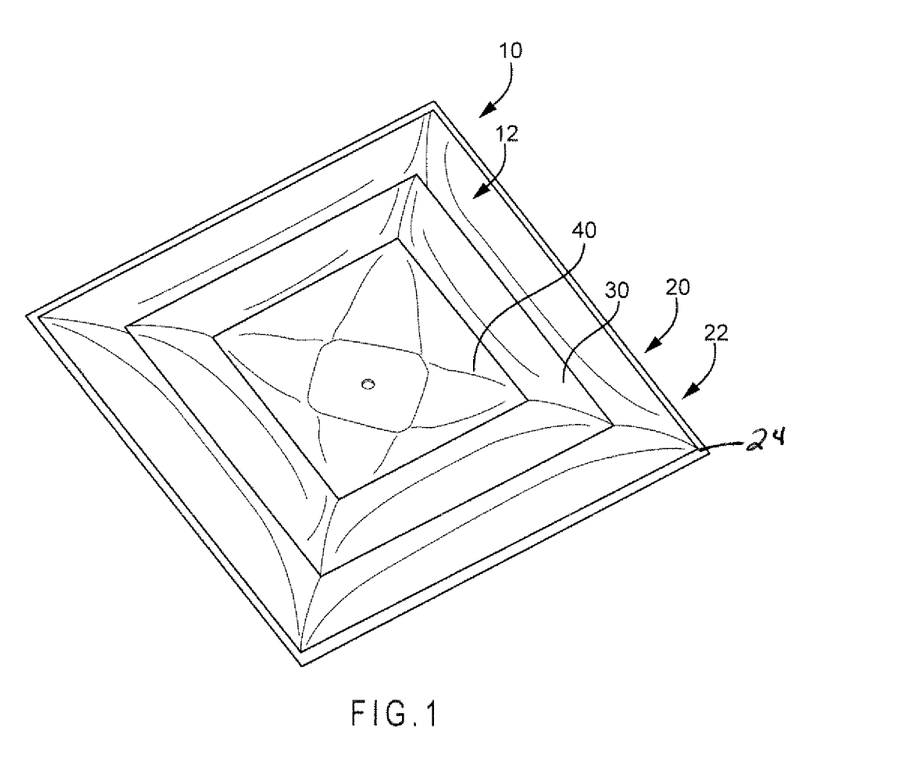
FIG. 1 illustrates a perspective view of a first embodiment as described herein.
Figure 2:
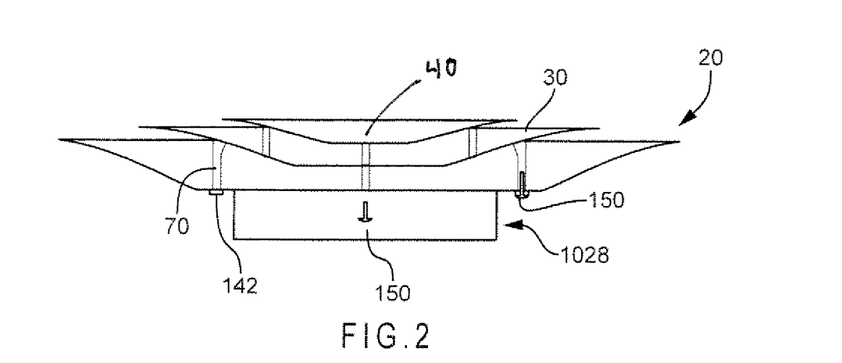
FIG. 2 illustrates a side cutaway view of the embodiment of FIG. 1.
Figure 3:
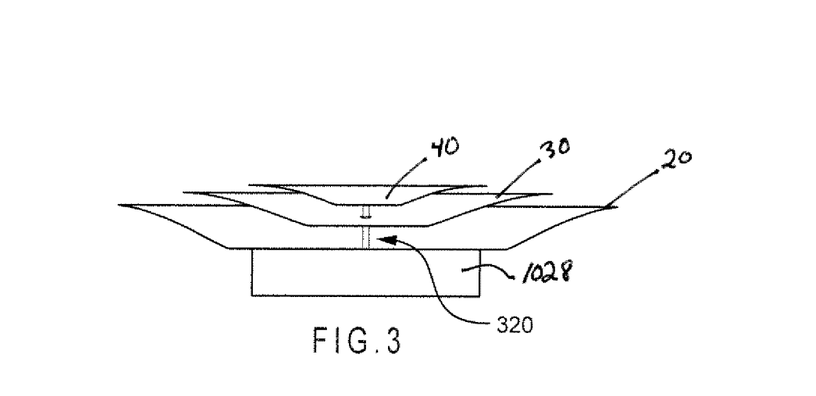
FIG. 3 illustrates a side cutaway view of an alternate embodiment as described herein.

As shown in FIG. 2, the base platform 20 may include a collar 1028 that allows attachment to ventilation ducting or other structural support.

Figure 4:
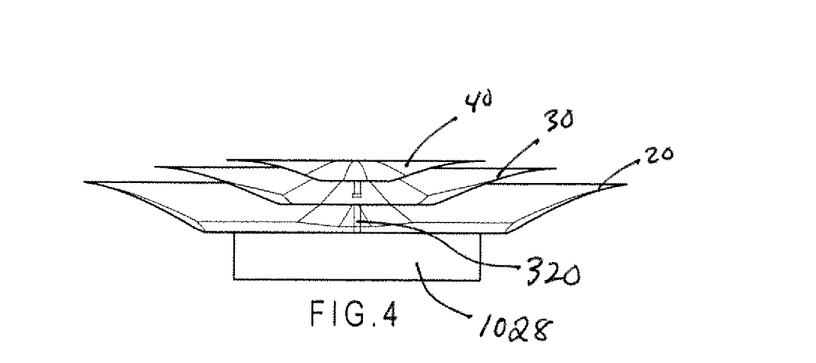
FIG. 4 illustrates a side cutaway view of another alternate embodiment as described herein.

FIG. 3 shows an alternate embodiment where the stems are center mounted rather than separated near the perimeters of the injection molded components. As shown in FIG. 3, central stems 320 are positioned in the center of each component. FIG. 4 shows a similar embodiment with slightly different diffuser plates.

Figure 8A:
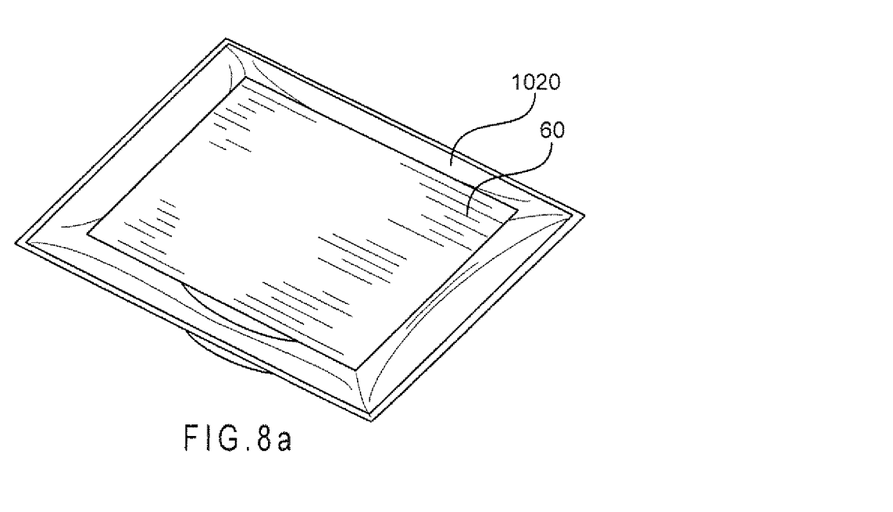
FIG. 8a illustrates a perspective view of another alternate embodiment as described herein.
Figure 8B:
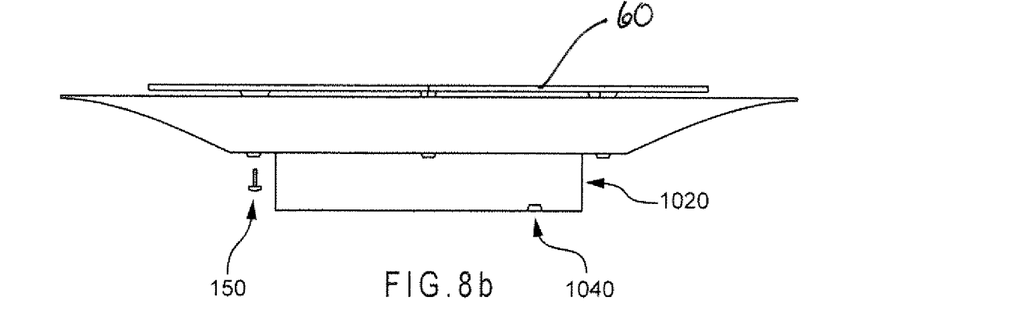

The embodiment shown in FIGS. 8a and 8b comprises a flat diffuser plate 60 and a base platform 1020. The base platform 1020 is formed similarly to the base platform 20 in the first embodiment above. The base platform 20 includes stems 70 that fit into receptacles on the base platform 20 in a similar fashion as the connections between the center diffuser plate 30 and the base platform 20 as described above.

While in the embodiments above, the stems are molded with the upper components via injection molding, it is contemplated that the stems may protrude from the lower component to fit into receptacles in the upper component, which is the reverse of what is shown in these drawings. As a further alternative, some of the stems may be molded to face upwardly on a single component and downwardly as well. In other words, the projection direction of components may be mixed throughout the assembly.

The molded component materials may comprise injection grade ABS, although other materials suitable for injection molding, such as other resins, may be used. The components may be assembled with mounting screws 150 such as #8×¾" pan head Phillips or Torx sheet metal screws (zinc coated steel or stainless steel, depending on the end use application).

The size of the base platform 20 may be a 23.75"×23.75" tray that fits into a standard 22.75" square ceiling opening. The base platform 20 is common to all embodiments above, and may be molded with interchangeable inserts and several different neck collar 1020 sizes, for example 6, 8, 10, 12 and 14 inches. Each neck collar 1020 includes two molded entry tabs 1040 shown in FIG. 8b to retain the flexible HVAC heating ducts when tied with retainer straps.

Figure 9:
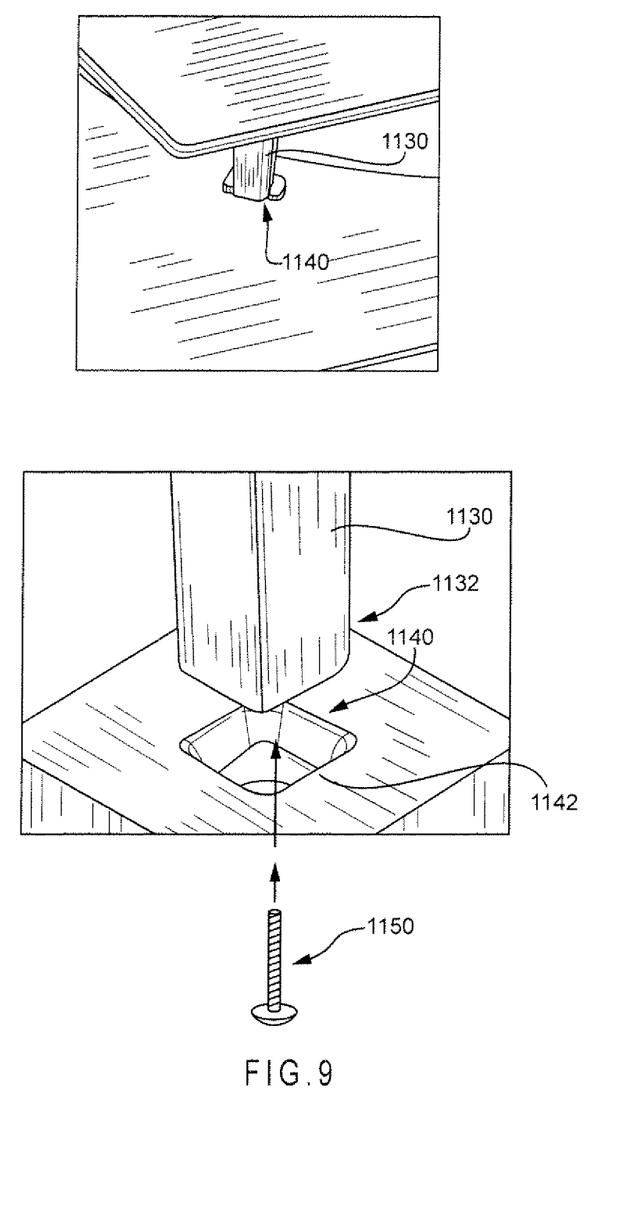
FIG. 9 illustrates views of a fastener for use with the embodiments described herein.
Figure 10:
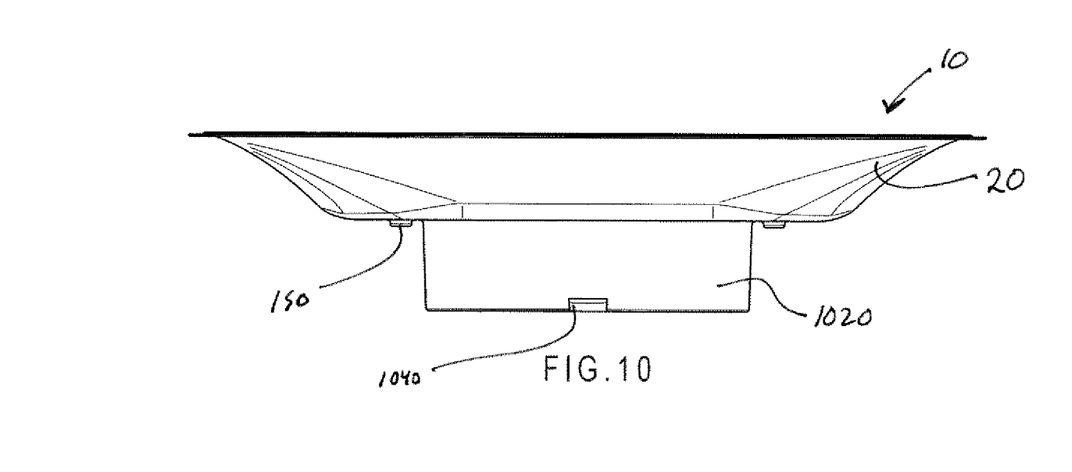
FIG. 10 illustrates a side cutaway view of the embodiment of FIG. 1.

As shown in FIG. 9, the mounting stems 1130 include free ends 1132 that are locked into corresponding receptacles 1140. In order to counteract the torque created by the mounting screws 1150 when driven into the free ends 1132 through the receptacle 1140, the receptacle 1140 and the stem ends 1132 may be of complimentary profile shapes, such as the "D" shape shown at 1142 in FIG. 9. The matching locking surfaces can be square in cross-section, rectangular, oval or any other shape that prevents the rotation and torque on the mounting stem.

Another embodiment is a method of manufacturing an air diffuser such as those illustrated in the above-referenced figures. The method comprises injection molding a base platform with an opening plenum and a collar for attachment to an HVAC system. The plenum is defined by a perimeter rim with edges that lie within a first common plane. A first diffuser plate is injection molded and includes edges lying within a second common plane, and a plurality of integrally injection molded stems. These stems are configured to secure the first diffuser plate with the base platform my being inserted into complementary female receptacles formed in the base platform. The first diffuser plate is positioned over the plenum, the stems are inserted into the complementary receptacles, and the stems are secured, using, for example, metal screws or other fasteners known in the art. The method may also encompass injection molding a second diffuser plate having integrally molded stems, positioning it over the first diffuser plate, and securing it to the first diffuser plate by inserting the stems into complementary female receptacles in the first diffuser plate. The stems may then be secured using any fastener known in the art, such as metal screws. Additional diffuser plates could also be attached in a similar fashion.

The invention claimed is:

1. An air diffuser for use at a ventilation outlet of an HVAC system, said air diffuser comprising:
   a base platform having an opening plenum formed from injection-molded plastic, said base platform including a collar for attachment to said outlet, said plenum defined by a perimeter rim having edges, said edges of said rim lying substantially along a first common plane;
   at least one first diffuser plate positioned over said plenum, said first diffuser plate formed from injection-molded plastic and having edges lying substantially along a second common plane; and
   a plurality of stems integrally molded with one or more of said first diffuser plate and said base platform, said stems configured to secure said first diffuser plate from said base platform, each of said stems having a first end sized to fit within a complementary female receptacle formed in one of said first diffuser plate and said base platform, said stems being formed via injection molding with one of said first diffuser plate and said base platform and said stems being disposed outwardly of the collar, a mechanical fastener passing through at least one stem of the plurality of stems and passing through at least one female receptacle to secure the at least one stem to the at least one female receptacle.

2. The air diffuser of claim 1, wherein said collar is annular.

3. The air diffuser of claim 1, wherein said stems are configured to separate said first diffuser plate from said base platform.

4. The air diffuser of claim 1, further comprising a fastener connecting said base platform to said first diffuser plate through an opening in at least one of said stems.

5. The air diffuser of claim 4, wherein said fastener is metal.

6. The air diffuser of claim 1, wherein said base platform and said first diffuser plate are square.

7. The air diffuser of claim 1, wherein said base platform and said first diffuser plate are rectangular.

8. The air diffuser of claim 1, wherein said base platform and said first diffuser plate are circular.

9. The air diffuser of claim 1, wherein said stems are square in cross section.

10. The air diffuser of claim 1, wherein said stems are rectangular in cross section.

11. The air diffuser of claim 1, wherein said stems are circular in cross section.

12. The air diffuser of claim 1, wherein said stems are D-shaped in cross section.

13. The air diffuser of claim 1, further comprising a second diffuser plate positioned over said first diffuser plate, said second diffuser plate formed from injection-molded plastic and having edges lying substantially along a third common plane.

14. The air diffuser of claim 1, further comprising a plurality of stems integrally molded with one or more of said second diffuser plate and said first diffuser plate, said stems configured to secure said second diffuser plate to said first diffuser plate, each of said stems having a first end sized to fit within a complementary female receptacle formed in one of said second diffuser plate and said first diffuser plate, said stems being formed via injection molding with one of said second diffuser plate and said first diffuser plate.

\* \* \* \* \*